Jan. 16, 1923.

M. G. WILLIAMS ET AL.
CLUTCH AND BRAKE LOCK.
FILED APR. 22, 1921.

1,442,203.

Michael G. Williams
Alcide Robechaud INVENTORS.

BY
Erwin Wheeler & Woolard ATTORNEYS.

Patented Jan. 16, 1923.

1,442,203

UNITED STATES PATENT OFFICE.

MICHAEL G. WILLIAMS AND ALCIDE ROBECHAUD, OF MILWAUKEE, WISCONSIN.

CLUTCH AND BRAKE LOCK.

Application filed April 22, 1921. Serial No. 463,699.

*To all whom it may concern:*

Be it known that we, MICHAEL G. WILLIAMS and ALCIDE ROBECHAUD, citizens of the United States, residing at Milwaukee, county of Milwaukee, and State of Wisconsin, have invented new and useful Improvements in Clutch and Brake Locks, of which the following is a specification.

This invention relates to clutch and brake locks for automobiles.

Objects of this invention are to provide a clutch or brake lock which is adjustable to fit different makes of automobiles; which embodies a built in lock; and which may be swung out of the way when it is desired to operate the automobile, thereby leaving a free and unobstructed space for the normal operation of the clutch or brake pedals.

Further objects are to provide a clutch or brake lock in which the jaws may be opened to allow their ready positioning about the pedal; to provide such jaws with cooperating parts adapted to be locked together; and to provide a plunger which, simultaneously with the locking of the jaws, locks the movable portion with respect to the body portion of the device.

An embodiment of the invention is shown in the accompanying drawings, in which.

Figure 1:
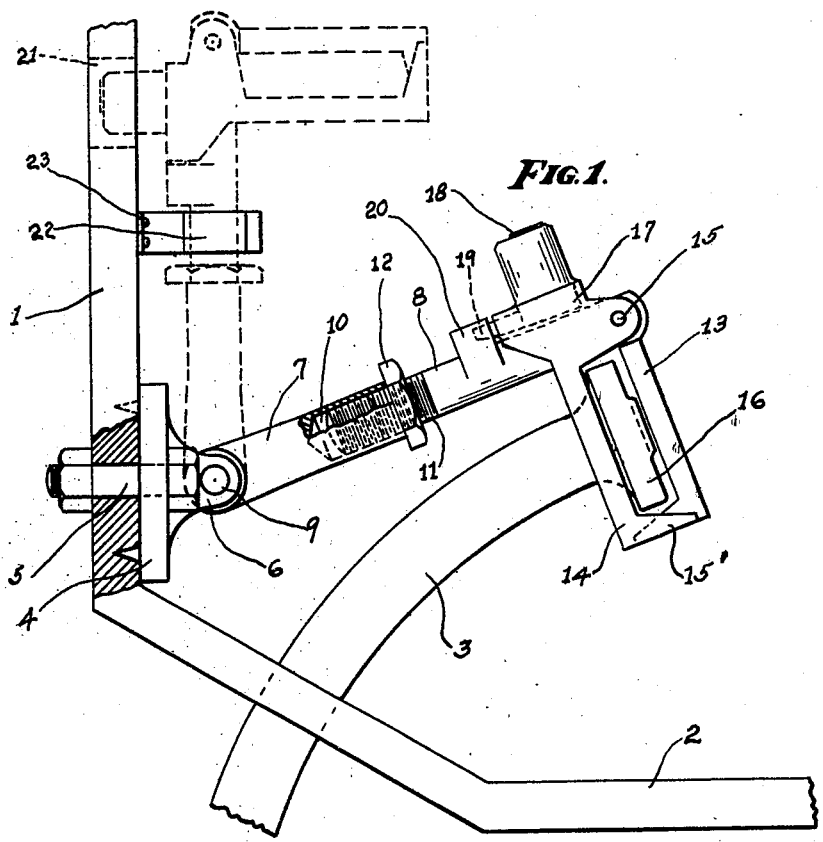
Fig. 1 is a view of the device in operative, locked position, showing in dotted lines the position it assumes when swung to inoperative position.
Figure 2:
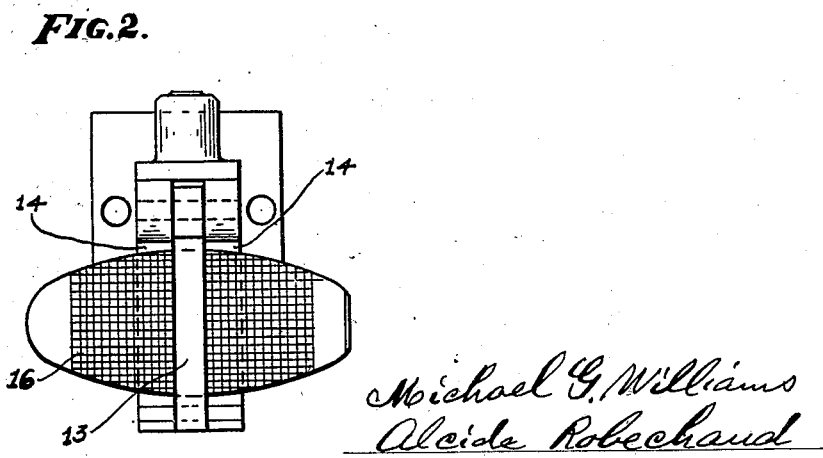
Fig. 2 is a view looking downwardly upon the top of the pedal when the lock is applied.

Figure 1 illustrates a fragment of the dashboard 1 and the floor 2 of an automobile with the clutch lever or rod 3 in open position. A bracket 4 is secured to the dashboard by means of a bolt 5 and is provided with a pair of outwardly projecting ears 6. An extensible rod comprising the inner and outer members 7 and 8 respectively has one end positioned between these brackets and is pivotally secured thereto by means of a pintle pin or bolt 9. The inner member is provided with a threaded opening 10 and the outer member is threaded at 11 to cooperate with the internal threads of the inner member so that by rotating the rod 8 the effective length may be varied. A suitable lock nut 12 is threaded upon the rod 8 and when the desired adjustment has been secured may be rotated to firmly lock the members 7 and 8 against relative motion.

Pedal engaging jaws are pivoted at 15 to the outer portion 8 of the extensible rod; a convenient way of forming these jaws is to provide a pair of lower jaws 14 and a single upper jaw 13, all of such jaws, however, having angularly formed tongues 15' adapted to overlap each other when the jaws are closed about the pedal 16 as indicated in Fig. 1. The rear portion of the jaws 14 have integrally formed therewith a casing 17 which encloses a built in lock 18. This lock is adapted to lock the jaws 13 and 14 together by projecting a plunger 19 outwardly into an opening formed in the lug 20 which latter is integral with the portion 8 of the extensible rod.

The rod and jaws are adapted to be swung upwardly into the dotted line position shown in Figure 1, a suitable recess 21 being provided in the dashboard 1, if desired, to accommodate the outwardly projecting casing of the lock. A spring clip having a pair of jaws 22 is secured by means of screws 23, for example, to the dashboard 1 in such position as to resiliently grip the shank 8 of the rod and hold the mechanism in the dotted line position in Figure 1 when desired to have the free use of the pedals of the automobile.

It is contemplated employing a pair of these devices upon the automobile, one for the clutch as indicated, and the other for the brake. The locking device for the brake is so adjusted that it will retain the brake in applied position to thereby lock the wheels against rotation. This, however, is not usually employed in the city as the city ordinances prohibit such locking of the automobile. However, in the country and in other places, for instance, in garages, it may be desirable to lock the brake when the brake is applied, to thereby prevent unauthorized moving of the automobile. Also, the clutch will be locked in off position or in open position as an additional precaution. In the city, however, it will be found sufficient to simply lock the clutch in open position. Such locking will not in any way interfere with the city ordinances.

It will be seen that a clutch or brake lock has been provided which will securely protect the owner of the automobile against theft. It will also be seen that such device may be readily and quickly unlocked by the owner by inserting the key in the portion 18 of the lock and releasing the jaws 13 and 14 thereby permitting such jaws to be swung outwardly and to allow the entire device to be rocked about the pintle 19 into its inoperative position out of the way of the mechanism of the automobile.

We claim:

1. A lock for an automobile operating pedal, comprising a bracket adapted to be attached to a portion of the automobile adjacent to and below such pedal, an arm pivotally mounted upon such bracket and projecting outwardly and upwardly therefrom roughly paralleling the line of travel of said pedal, relatively movable jaws carried by the outer end of said arm and adapted to fit over and around the foot engaging portion of said pedal, and a lock for locking said arms together.

2. A lock for an automobile, comprising a rigid bracket adapted to be attached to said automobile at a point below the normal position of the pedal, an extensible rigid rod pivotally mounted upon said bracket, jaws carried by said rod and adapted to fit over and retain the foot engaging portion of the pedal between them, a rigid housing upon said rod, and a lock in said housing adapted to lock the jaws in position to engage said pedal.

3. A lock for a foot pedal of an automobile, comprising a bracket adapted to be secured to the automobile below the upper portion of said pedal; an extensible rigid rod pivotally carried by said bracket and extending upwardly therefrom; a pair of pivotally associated jaws carried by said rod and adapted to span, and lie closely adjacent, opposite sides of the foot receiving portion of said pedal, and to project across both margins thereof, one of said jaws being rigid with said rod; and a built in lock carried by one of said jaws and adapted to lock said jaws against relative motion.

MICHAEL G. WILLIAMS.
ALCIDE ROBECHAUD.